United States Patent [19]

Fujimoto et al.

[11] Patent Number: 5,434,194
[45] Date of Patent: Jul. 18, 1995

[54] METHOD FOR MAKING A CELLULAR RUBBER, CELLULAR RUBBERS OBTAINED BY THE METHOD, AND COSMETIC PUFFS MADE OF THE CELLULAR RUBBER

[75] Inventors: Satoshi Fujimoto; Masafumi Sugiyama, both of Hiroshima, Japan

[73] Assignee: Nishikawa Rubber Co., Ltd., Hiroshima, Japan

[21] Appl. No.: 38,515

[22] Filed: Mar. 29, 1993

[51] Int. Cl.$^6$ .......................... C08J 9/04; C08L 21/00
[52] U.S. Cl. ........................ 521/134; 521/51; 521/59; 521/70; 521/71; 521/72; 521/75; 521/138; 521/140; 521/142; 424/400; 424/401; D28/4; D28/7
[58] Field of Search .................. 521/59, 51, 142, 140, 521/134, 138, 70, 71, 72, 45; D28/4, 7; 424/400, 401

[56] References Cited

U.S. PATENT DOCUMENTS

| | | | |
|---|---|---|---|
| 4,127,547 | 11/1978 | Smarook | 521/98 |
| 4,394,930 | 7/1983 | Korpman | 521/149 |
| 5,011,875 | 4/1991 | Yamamoto et al. | 525/186 |
| 5,021,050 | 6/1991 | Iskra | 604/379 |

*Primary Examiner*—Joseph L. Schofer
*Assistant Examiner*—John M. Cooney, Jr.
*Attorney, Agent, or Firm*—Flynn, Thiel, Boutell & Tanis

[57] ABSTRACT

A method for making a cellular rubber is described, in which water is added to a high water absorption resin, followed by allowing the resulting mixture to stand and form a hydrous gel. The hydrous gel, with or without a foaming agent, is added to a rubber compound and subjected to foaming under conditions sufficient for vulcanization thereby obtaining a cellular rubber having a closed cell structure. Cosmetic puffs using the cellular rubber are also described.

14 Claims, 2 Drawing Sheets

2

2

2

ROUGH

SIZE OF FOAM

CLOSE

METHOD FOR MAKING A CELLULAR RUBBER, CELLULAR RUBBERS OBTAINED BY THE METHOD, AND COSMETIC PUFFS MADE OF THE CELLULAR RUBBER

BACKGROUND OF THE INVENTION

1. Field of the Invention

This invention relates to a method for making a cellular rubber having a closed cell structure which is particularly suitable for use as a material for cosmetic puffs. The invention also relates to cellular rubbers made by the above method and cosmetic puffs made of the cellular rubbers.

2. Description of the Prior Art

Cosmetic puffs which have been conventionally employed are those which are made of cellular rubbers which are obtained from rubber latex and have an open-cell structure, and sponge rubbers having a closed cell structure.

These known puffs have, respectively, disadvantages which follow. With the puffs made from latex, a liquid foundation is absorbed in the puff, enabling the hands to be readily contaminated with such a foundation. Alternatively, a solid foundation is likely to enter into the inside of the puff, rendering it difficult to wash the puff after its use. Another problem resides in that the puff is unlikely to dry to the inside thereof with the tendency of causing germs or bacteria to propagate therein, thus being unsanitary.

With the latter sponge rubber, the foams are so dense that slicking takes place at the time of makeup. In order to solve the slicking problem, it is usual to roughen the surface of the sponge rubber by after-treatments such as polishing to form a roughened surface 1 as shown in FIG. 2, in which reference numeral 2 indicates cells or foams. However, this presents the problem that the toughened surface becomes fragile.

SUMMARY OF THE INVENTION

It is accordingly an object of the invention to provide a method for making a cellular rubber which has a close-cell structure and is suitable for use as cosmetic puffs whereby the problems involved in the prior art counterparts can be solve.

It is another object of the invention to provide a cosmetic puff which is made of the cellular rubber made by the method mentioned above.

According to one embodiment of the invention, there is provided a method for making a cellular rubber which comprises adding water to a high water absorption resin, allowing the resulting mixture to stand thereby forming a hydrous gel, adding, to a rubber compound, the hydrous gel, and subjecting the resulting mixture to foaming under conditions sufficient for vulcanization of the rubber compound thereby obtaining a cellular rubber having a closed cell structure.

Preferably, azodicarbonamide is further added to the rubber compound as a foaming agent.

According to another embodiment of the invention, there is also provided a puff for cosmetics which comprises a shaped cellular rubber which is obtained by adding a hydrous gel made of a high water absorption resin and water to a silicone-modified rubber, and shaping and foaming the resultant mixture, thereby obtaining a closed cell puff article. In this case, azodicarbonamide is preferably added as a foaming agent. It will be noted that the foaming takes place by the action of the moisture in the hydrous gel and/or the azodicarbonamide foaming agent.

PREFERRED EMBODIMENT OF THE INVENTION

Figure 1A:
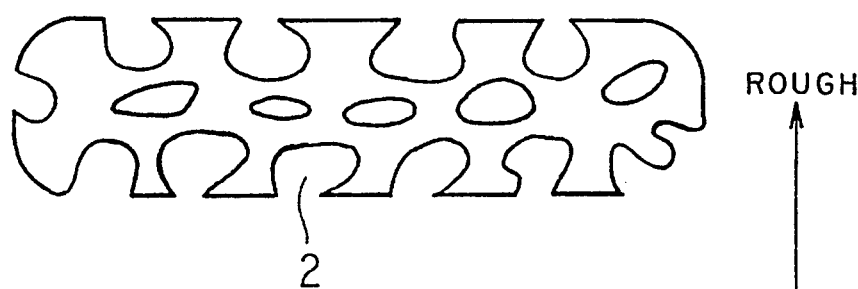
FIG. 1 is respectively, schematic sectional views showing cellular rubbers having different cell sizes.

In accordance with the method of the invention, water is first added to a high water absorption resin. The high water absorption resin useful in the invention is one which is capable of yielding a water-containing or hydrous gel when the resin is allowed to stand in water. Examples of such resins include an isobutylene-maleic anhydride copolymer crosslinked material, sodium polyacrylate crosslinked material, carboxy methyl cellulose crosslinked material, polyethylene oxide crosslinked material and the like. Of these, the isobutylene-maleic anhydride crosslinked product is preferably used. This product is available from Kurare Co., Ltd. under the designation of KI gel. In general, the resin is added to water in an amount of from 1 to 50 g per 100 ml of water.

Thereafter, the mixture is allowed to stand for a time sufficient to produce a hydrous gel. The hydrous gel is usually formed for 1 to 10 hours.

Next, a rubber compound is added to the hydrous gel. The rubber compound used in the present invention may be any rubber compound which comprises a major proportion of rubber and a minor proportion of additives such as crosslinking agents, benzoyl peroxide, ditertiary butyl peroxide, 2.5 dimethyl-2.5 ditertiary-peroxy hexane, tertiary-butyl-cumylperoxide and the like. The type of rubber is not limited but preferably includes silicone-modified rubbers, silicone rubber, ethylene-propylene-dienomethylene rubber, acrylic rubber and the like. Of these, silicone-modified rubbers are preferred.

Preferably, the hydrous gel is present in an amount of from 0.5 to 10 parts by weight per 100 parts by weight of the rubber compound. Azodicarbonamide is used in an amount of up to 10 parts by weight per 100 parts by weight of the rubber compound.

The crosslinking agents may not be limited to specific types provided that they are not harmful when applied particularly as cosmetic puffs. A specific and preferred example include dicumyl peroxide.

The mixture is finally subjected to foaming thereby obtaining a cellular rubber having a closed cell structure. Usually, the mixture is subjected to press molding at a temperature of from 120° to 180° C. for a time of 5 to 30 minutes, under which foaming and vulcanization proceed satisfactorily. By this, the closed cell structure can be formed.

The cell size can be arbitrarily controlled by changing the ratio by weight of the hydrous gel to the azodicarbonamide as will be particularly described in examples. If the ratio of the hydrous gel to the azodicarbonamide is increased, the cell size increases. A preferable ratio of the gel to the azodicarbonamide is in the range of from 100:1 to 0.1:1.

When the cellular rubber is applied for cosmetic service, it is preferred to use a silicone-modified ethylene-propylene-dienomethylene rubber. For this purpose, dicumyl peroxide is preferably used as a crosslinking agent. Moreover, a preferable high water absorption resin is an isobutylene-maleic anhydride copolymer crosslinked product.

The present invention is more particularly described by way of examples.

EXAMPLES 1 to 4

100 ml of water was added to an isobutylene-maleic anhydride copolymer crosslinked product available from Kurare Co., Ltd., under the designation of KI Gel and allowed to stand overnight to obtain a hydrous gel. The hydrous gel and azodicarbonamide (ADCA) commercially available under the designation of Vinyhol AC#1, which was used as a foaming agent, were added to silicone-modified ethylene-propylenedienomethylene rubber (SEPX-620U) containing a dicumyl peroxide crosslinking agent, in different amounts as indicated in the Table, respectively. The resultant mixtures were each press molded for foaming and vulcanization under conditions of 150° C.×10 minutes thereby obtaining cellular rubber having a closed cell structure.

Figure 1B:
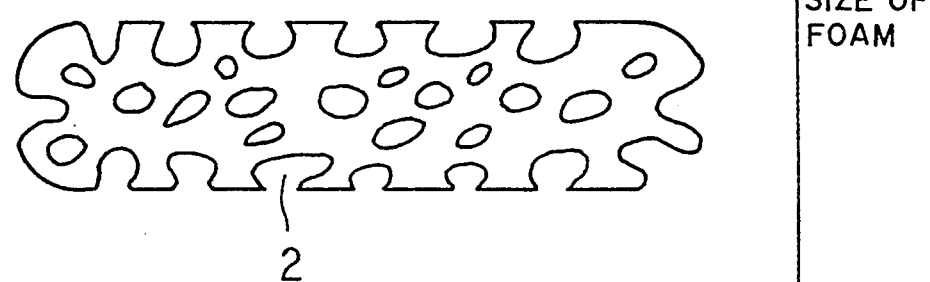
Figure 1C:
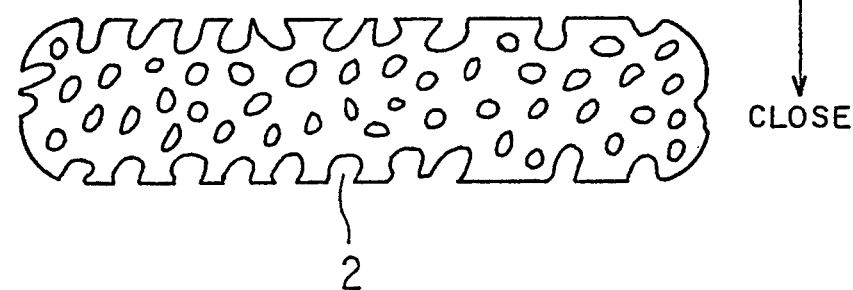
Figure 2:
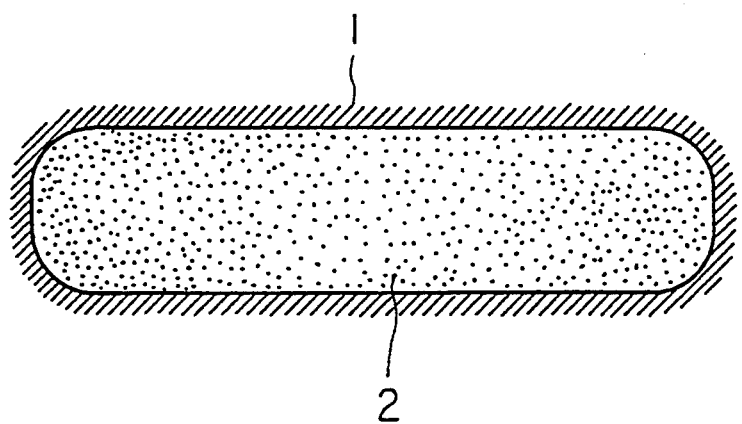
FIG. 2 is a schematic sectional view showing a prior art puff.

The cellular rubbers obtained in this manner were subjected to measurements of the size of foams in the surface and water absorption. The size was determined by the use of a magnifying glass. The results are shown in the table. As shown in FIG. 1, when changing the ratio by weight of the hydrous gel to ADCA, the size of the cellular rubber is controllable, i.e. when the ratio of the hydrous gel to ADCA is increased, the size increases. In FIG. 1, reference numeral 2 indicates foams.

For a comparison, the above procedure was repeated except that 6 parts by weight of ADCA was added to 100 parts by weight of SEPX-620U without addition of any hydrous gel. The resultant cellular rubber had a foaming ratio of 7, a surface foam size of 0.1 mm and a water absorption of 1%. The surface was dense. Thus, a comparison of the results of Examples with those for the comparison reveal that the size is larger with a greater water absorption in the present invention.

As will be apparent from the above, according to the invention, there can be obtained a kind of sponge which has a rough surface with a closed cell structure without carrying out any after-treatment. Such a sponge prevents water of liquid foundation from entering into the inside thereof. Thus, the sponge can be readily washed with water and is likely to dry, ensuring good sanitary conditions. In addition, when the ratio of the hydrous gel to the foaming agent is properly changed, the size or diameter of foams can be readily changed. Thus, optimum properties can be applied to a cellular rubber when applied as cosmetic puffs which should have minute touch.

TABLE

| | Example | | | |
|---|---|---|---|---|
| | 1 | 2 | 3 | 4 |
| Formulation: | | | | |
| SEPX-620U | 100 PHR | 100 PHR | 100 PHR | 100 PHR |
| ADCA | 0 | 0.1 | 0.5 | 0.5 |
| Hydrous Gel | 3 | 3 | 3 | 2 |
| DCP (dicumyl peroxide) | 5 | 2 | 2 | 2 |
| Hydrous Gel/ADCA | infinite | 30 | 6 | 4 |
| Foaming Ratio | 5 | 5 | 5 | 5 |
| Foam Size in Surface* | 6 mm | 3 mm | 2 mm | 0.8 mm |
| Water Absorption | 16% | 7% | 6% | 3% |

*Determined by use of a magnifying lens.

What is claimed is:

1. A method for making a cellular rubber cosmetic puff which comprises mixing water and a high water absorption resin to form a mixture, allowing the mixture to stand thereby forming a hydrous gel, mixing said hydrous gel and a rubber compound to form another mixture, and subjecting said another mixture to press molding at an elevated temperature effective for foaming and vulcanization to obtain a cellular rubber cosmetic puff having an outer foam surface that exhibits improved water absorption for cosmetic foundation application purposes and an inner closed cell structure that prevents entrance of water of the cosmetic foundation inside of said puff.

2. The method according to claim 1, wherein said high water absorption resin consists essentially of an isobutylene-maleic anhydride copolymer crosslinked material.

3. The method according to claim 1, wherein said resin is added to water in an amount of from 1 to 50 g per 100 ml of water.

4. The method according to claim 1, wherein said rubber compound comprises a silicone-modified rubber.

5. The method according to claim 1, wherein said hydrous gel is added to the rubber compound in an amount of 0.5 to 10 parts by weight per 100 parts by weight of the rubber compound.

6. The method according to claim 1, wherein the foaming is carried out by press molding the mixture at a temperature of from 120° to 180 ° C.

7. The method according to claim 1, further comprising azodicarbonamide which is added to the rubber compound along with said hydrous gel in an amount of up to 10 parts by weight per 100 parts by weight of the rubber compound.

8. The method according to claim 7, wherein a ratio of the hydrous gel to the azodicarbonamide is changed whereby a foam size in the surface of the cellular rubber is changed.

9. A cellular rubber cosmetic puff obtained by the method as claimed in claim 1.

10. A cosmetic puff which comprises a shaped cellular rubber made by mixing a hydrous gel comprising a high water absorption resin and water with a silicone modified rubber, and press molding the resultant mixture at an elevated temperature effective for foaming and vulcanization, thereby obtaining an inner closed cell puff structure underlying an outer foam puff surface having improved water absorption for cosmetic foundation application purposes, said inner closed cell puff structure preventing entrance of water of the cosmetic foundation inside of said puff.

11. The cosmetic puff according to claim 10, wherein said high water absorption resin consists essentially of an isobutylene-maleic anhydride copolymer crosslinked product.

12. The cosmetic puff according to claim 10, wherein said silicone modified rubber consists essentially of a silicone-modified etylene-propylen-dienomethylene rubber.

13. The cosmetic puff according to claim 10, further comprising azodicarbonamide along with the hydrous gel.

14. The cosmetic puff according to claim 13, wherein a ratio of the hydrous gel to the azodicarbonamide is changed whereby a foam size in the surface of the cellular rubber is changed.

* * * * *

UNITED STATES PATENT AND TRADEMARK OFFICE
CERTIFICATE OF CORRECTION

PATENT NO. : 5 434 194
DATED : July 18, 1995
INVENTOR(S) : Satoshi FUJIMOTO et al It is certified that error appears in the above-indentified patent and that said Letters Patent is hereby corrected as shown below:

Column 4, line 59; change "etylene-propylen-dienomethylene" to ---ethylene-propylene-dienomethylene---.

Signed and Sealed this

Ninth Day of April, 1996

Attest:

BRUCE LEHMAN

Attesting Officer

Commissioner of Patents and Trademarks